Aug. 4, 1953  H. J. SHIVE  2,647,296
METHOD OF MANUFACTURING TUBULAR INSULATION
Filed May 31, 1950
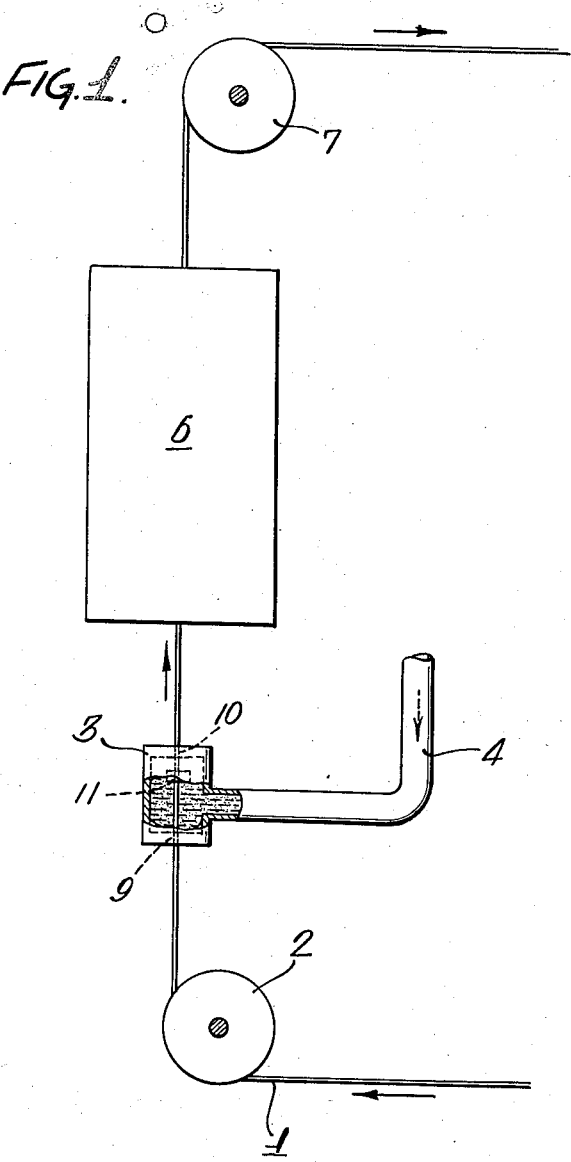
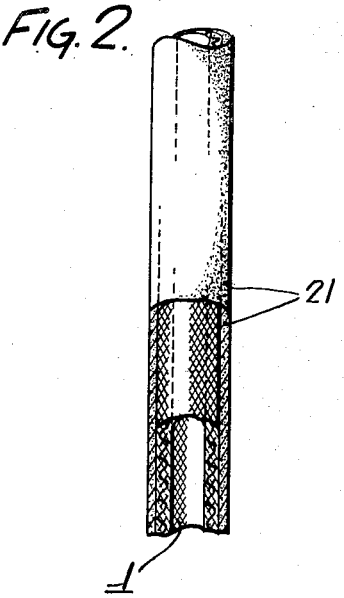
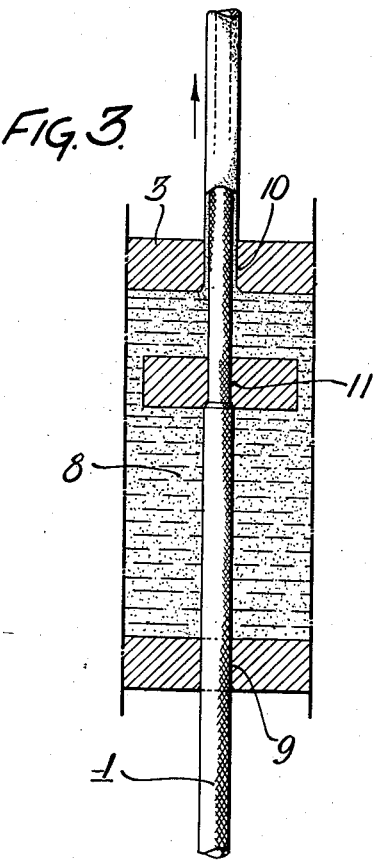
Inventor:
Howard J. Shive
by his Attorneys
Howson &
Howson Patented Aug. 4, 1953

2,647,296

UNITED STATES PATENT OFFICE 2,647,296

METHOD OF MANUFACTURING TUBULAR INSULATION

Howard J. Shive, Schwenksville, Pa., assignor to Bentley-Harris Manufacturing Company, Conshohocken, Pa., a corporation of Pennsylvania Application May 31, 1950, Serial No. 165,231

9 Claims. (Cl. 28—74)

The present invention relates to a novel process for the manufacture of flexible tubular electrical insulation; and more particularly, it relates to a novel process for the application of a continuous flexible coating comprising a plasticized polyvinyl resin on woven or knitted fabric tubing, or sleeving.

Tubular electrical insulating materials comprising fabric tubing having an outer moistureproof, flexible coating thereon, and into which a wire or wires may be inserted to provide insulated electrical wiring, are well-known. Prior procedures for applying the coating to the fabric tubing have involved the application of a solution of a film-forming material to the fabric tubing or sleeving, and permitting the solution to dry, leaving behind the coating. For example, it has been the practice in the past to apply a solution of, for example, a vinyl resin, in a volatile solvent therefor, to the fabric tubing and then to evaporate the solvent, leaving behind the resin as a thin film. This procedure possessed many disadvantages, the most noted of which was the fact that in order to provide a coating of the desired thickness, several applications of the solution had to be made in order to build up the desired thickness. In a specific case, in order to get the desired thickness of the coating, the fabric tubing had to be treated with the resin solution and then dried, followed by further treatment with the resin solution and further drying, and this procedure repeated for a total of about sixteen to twenty-four times until the desired thickness had been built up. Obviously, this procedure was cumbersome and costly. By this procedure, moreover, it was often difficult to obtain a coating of uniform thickness around the periphery of the insulation as well as throughout its length. In order to provide more rigid control of the successive applications of resin solution, it has been attempted in certain cases to apply the solution manually. This, of course, is also a very time-consuming and laborious procedure.

The application of a continuous coating to a fabric tubing, in the manufacture of electrical insulation material, presents many problems. In the first place, the coating must be of uniform thickness throughout the length and periphery of the product. Thin areas exposing the underlying fabric tubular sleeving, as well as thick and uneven portions due to the running of the coating solution, cannot be tolerated. Moreover, it is often necessary to employ a heat stabilizing agent for use in conjunction with the vinyl resin to prevent deterioration of the coating when equipment containing the insulating material becomes heated in assembly or operation. It has been found that due to the tendency of such a stabilizing agent to settle out from a vinyl resin solution, it is a very difficult matter to incorporate the desired amount of stabilizing agent in the coating by using such a solution. In addition, since the fabric tubing is hollow, the wire or wires being inserted after the coating has been applied to the fabric, there is danger of the fabric tubing distorting or collapsing during the coating operation resulting in a distorted product.

It is, therefore, a principal object of the present invention to provide a process for coating fabric tubing in the manufacture of insulation material by which the prior difficulties are overcome.

A further object is to provide a process for the application of a plasticized vinyl resin coating to a fabric tubing by which a coating of the desired thickness may be made in one operation.

A further object of the present invention is to provide a process for the coating of fabric tubing by which a coating having a uniform thickness throughout the periphery and length of the product may be readily provided.

Still another object is to provide a process for the coating of fabric tubing with a plasticized vinyl resin in which the required amount of heat-stabilizing agent or agents for vinyl resins may be readily incorporated in the coating.

Still another object is to provide a process for coating a hollow fabric tubing in the manufacture of electrical insulating material without danger of distorting or collapsing the fabric tubing during the coating operation.

Further objects will become apparent from a consideration of the following specification and the claims.

The process of the present invention comprises continuously introducing a fabric tubing vertically into a body of vinyl resin plastisol; continuously passing said tubing while in said body of plastisol in a vertical direction through a constricting die positioned in said body of plastisol; continuously withdrawing said tubing vertically from the top of said body of plastisol through an orifice having a diameter slightly greater than the outer diameter of the said fabric tubing passing therethrough, said fabric tubing being centered in said orifice to provide a uniform annular space between the outside of said fabric tubing and the inner periphery of said orifice; continuously passing the resulting coated fabric tubing in a vertical direction through a heating zone to flux the particles of resin in said plastisol providing a continuous plasticized vinyl resin coating; continuously withdrawing said coated product from said heating zone in a vertical direction and permitting said coated product to cool.

The operation of the process of the present invention may be more easily understood from a consideration of the drawings in which:

Fig. 1 shows diagrammatically, apparatus in which the process of the present invention may be practiced, Fig. 2 illustrates the resulting coated product with the coating partially removed, and Fig. 3 is an enlarged schematic sectional view of the applicator shown in Fig. 1.

Referring specifically to the fabric tubing, or sleeving, which is coated in accordance with the process of the present invention, it may be prepared from any fabric which is of a woven, including braided, or knitted nature. Such tubing is well-known and has been employed as insulation material for current-carrying wires. The material from which the fabric is made may be selected from a wide range of textile materials, including glass yarns; rayon yarns; cotton yarns; resin yarns, for instance, vinyl resin yarns, nylon yarns, and the like, combinations of two or more of these, and the like. The fabric tubing will vary in diameter depending upon the size of insulation desired, and may range from relatively fine tubing having an inside diameter of about .020 inch, up to fairly large tubing having an inside diameter of about 1 inch. Of the various materials available for the preparation of fabric tubing for insulation purposes, glass fabrics, that is, fabric woven or knitted from yarns made from spun glass filaments, particularly braided glass fabrics, are presently preferred.

As stated, in accordance with the process of the present invention, the fabric tubing is coated in a novel manner with a vinyl resin plastisol. Plastisols, as is well-known in the art, are suspensions of finely-divided solid particles of resin in a plasticizer. The vinyl resins that may be employed in the plastisol in accordance with the present process are well-known and include polyvinyl chloride, polyvinyl acetate, copolymers of vinyl chloride and vinyl acetate, polyvinyl acetal, polyvinyl butyral, polyethylene (polyvinylhydride), polyvinylidene chloride, and the like. Of the various vinyl resins available, the copolymers of vinyl chloride and vinyl acetate are presently preferred.

Referring to the plasticizer which makes up the liquid vehicle of the plastisol, they are, as is well-known, high-boiling organic liquids, generally having a boiling point of above about 200° C., in which the vinyl resin particles are substantially insoluble at ordinary temperatures, but in which at an elevated temperature, the particles will flux and dissolve to form a single phase, resinous mass. Since the plasticizer is substantially non-volatile, substantially all thereof enters into and becomes part of the resinous mass. Examples of plasticizers are the di-phthalates, such as dicyclohexyl phthalate, dibutoxyethyl phthalate, cyclohexylbutyl phthalate, cyclohexylamyl phthalate, diethoxyethyl phthalate, dibutyl phthalate, dicapryl phthalate, dioctyl phthalate, diallyl phthalate, and the like; the di-sebacates such as dibutyl sebacate, dibenzyl sebacate, dimethyl sebacate, dioctylsebacate, glycol sebacate, and the like; the organic tri-phosphates such as triethyl phosphate, tri-2-ethylhexyl phosphate, tri-butyl phosphate, tri-p-tert-butylphenyl phosphate, tri-phenyl phosphate, tri-cresyl phosphate, tributoxyethyl phosphate, and the like; butylphthalylbutyl glycolate; triethylene glycol di-2-ethylbutyrate; triethylene glycol di-2-ethyl hexoate; tetrahydrofurfuryl oleate; and the like, glycerol monoricinoleate, glycerol triacetate, glycerol triricinoleate.

In the plastisol employed in accordance with the process of the present invention, the plasticizer will be present in an amount at least to provide a liquid mass. The lower limit of plasticizer for this purpose will vary, of course, depending upon the particular plasticizer, the particular vinyl resin, and upon the particular additives, of the type discussed below, and amount thereof incorporated in the plastisol. The resin will be present in amount at least to provide, upon fluxing of the particles thereof, a continuous resinous film having the desired toughness, abrasion resistance, electrical properties and flexibility. The minimum amount of resin required for this purpose will also vary depending upon the above-mentioned factors. Thus, bearing these variables in mind, it may be stated that the plasticizer will generally be present in an amount between about 40 and about 150 parts by weight thereof, per hundred parts by weight of the vinyl resin. More generally, the plasticizer will be present in an amount between about 75 and about 125 parts by weight thereof per hundred parts by weight of the vinyl resin.

The plastisol may contain small amounts of other materials normally added to vinyl resin plastisols. For example, it is preferable to include a heat-stabilizing agent. Examples of such heat-stabilizing agents are lead compounds, such as lead silicate, lead titanate, basic lead carbonate, lead stearate, lead oleate, and the like; bismuth oxides; the alkaline earth metal compounds such as the soaps, for instance, calcium stearate and barium ricinoleate, the oxides, for instance, barium oxide, the silicates, for instance, calcium silicate, the resinates, carbonates, and the like; cadmium ricinoleate, and the like; organic compounds such as the olefin oxides, for instance, epichlorohydrin, phenoxypropeneoxide, and the like; water-insoluble organic amines; and the like. Mixtures of two or more of these stabilizing agents may be employed if desired. The amount of stabilizer employed may vary widely since, as will be noted from the above, certain of the compounds mentioned may also function as a filler. Normally, however, the stabilizer will be present in an amount no higher than about 25% by weight.

There may also be included in the plastisol, a small amount of pigment if colored effects are desired. Pigments for use in vinyl resin compositions are well-known, and if such pigment is employed, it will generally not be in excess of about 10%.

As stated, in accordance with the process of the present invention, the fabric tubing is introduced in a vertical direction into a body of the vinyl resin plastisol, passing upwardly in a vertical direction through the body of plastisol, passing through a constricting orifice, or die, positioned in said body of plastisol, and emerging vertically from the top of the body of plastisol through a circular orifice. The exit orifice, as stated, will have a diameter somewhat larger than the outside diameter of the fabric tubing passing therethrough, and the fabric tubing will be centered in the orifice to provide a uniform annular space between the outside of the tubing and the inside periphery of the orifice. The width of the annular space controls the thickness of the coating and accordingly, may range from as small as about 1 mil up to as high as about 100 mils, depending, of course, upon the size of the tubular insulation to be provided, and upon the thickness of coating desired. The body of plastisol through which the fabric tubing is passed during the coating operation, may be conveniently held in any receptacle having an opening, such as a circular orifice, at the bottom, placed directly beneath the above-described constricting orifice, or die, and the orifice defining the point from which the coated fabric tubing emerges from the body of plastisol. The opening at the bottom of the plastisol-containing receptacle will form a snug fit with the incoming fabric tubing so that, in conjunction with the upward movement of the fabric tubing, plastisol will not leak out from the bottom of the receptacle.

As stated, there is positioned between the entrance orifice and the exit orifice of the plastisol-containing receptacle, a third orifice, or circular die, axially aligned with the other two mentioned orifices. This intermediate orifice will have a diameter somewhat less than the outside diameter of the fabric tubing, and upon the passage of the fabric tubing therethrough, constricts the fabric tubing, imparting a true cylindrical shape thereto just prior to its coating with the plastisol. In addition, the drag caused by the constricting orifice produces a tension within the fabric tubing, preventing it from swaying and maintaining it in true alignment for its passage through the exit orifice. This constricting orifice, in conjunction with the tension caused thereby, compresses the fabric tubing decreasing its outside diameter to that of the constricting orifice. Thus, the diameter of this intermediate constricting orifice defines the outside diameter of the fabric tubing just prior to its coating and insures uniformity. Therefore, herein, where reference is made to the difference between the diameter of the orifice through which the fabric tubing emerges from the body of plastisol and the outside diameter of the fabric tubing passing therethrough, it will be understood that the term "outside diameter of the fabric tubing passing therethrough" refers to the outside diameter of the fabric tubing as altered in passage through such a constricting orifice.

In accordance with the preferred practice of the process, the plastisol in the coating zone is maintained under a slight positive pressure in order to facilitate the coating of the fabric tubing. The pressure may conveniently be provided by the weight of the plastisol itself, such as by maintaining a column of the plastisol in flow communication with the plastisol body through which the fabric tubing passes. However, other means of providing a positive pressure on the liquid plastisol in the coating zone, such by the use of compressed air, a pump, and the like, may be employed, if desired. Pressures in excess of that corresponding to about 48 inches of plastisol may distort or collapse the tubing, and, therefore, pressures in excess of that figure are generally not employed. Generally the pressure will be equivalent to at least about 6 inches of plastisol, and preferably pressures equivalent to between about 10 and about 30 inches of plastisol will be employed. A particularly advantageous applicating device, which may be employed in the preferred embodiment of the present process is disclosed and claimed in my co-pending application Serial Number 165,232, filed May 31, 1950.

Upon emerging from the body of plastisol, the fabric tubing with the wet plastisol coating thereon passes upwardly in a vertical direction, through a heating zone. In the heating zone, the plastisol coating becomes heated to an elevated temperature where the resin particles flux and fuse with the plasticizer forming a continuous, single phase resinous mass. Generally, the temperature to which the plastisol coating is heated will be at least about 250° F. Temperatures much in excess of about 600° F. are not employed because of the danger of decomposing the organic materials present. Preferably the temperature to which the plastisol coating is heated lies between about 300° and about 450° F. The heating zone may be of any desired construction adapted to impart the desired temperatures. The heat may be supplied by radiation, conduction, or convection, or dielectric heating may be employed, in accordance with well-known practice. A preferred method of heating the coated tubing is by radiation, particularly by the use of infra red heating lamps. A particularly advantageous heating zone in this regard is disclosed and claimed in said co-pending application Serial Number 165,232.

Upon emergence of the coated tube from the heating zone, the coating may be somewhat soft, and, therefore, before passing over a pulley or being wound on a reel or otherwise collected, the coated tube is permitted to cool until the coating sets. This cooling presents no problem, and merely briefly contacting the coated product with the atmosphere outside the heating zone is sufficient although it will be realized that other cooling means may be employed, if desired. In many cases, particularly where a relatively heavy coating has been applied, it is desirable to pass a current of cool air over the coated product as it emerges from the heating zone.

Once the coating has cooled to where it is no longer soft, the coated tubing is ready for use and may be cut to convenient lengths for any particular application. The wire is inserted into the tubing by well-known means. The wire may also have insulation thereon, and a plurality of wires may be inserted into the tubing, in which case the tubing of the invention serves as a conduit for a plurality of current-carrying conductors.

The entire operation as described above is continuous, the fabric tubing continuously passing through the plastisol, the heating zone and cooling. The operation of such a continuous process may be readily seen from a consideration of the drawings.

Referring then to the drawings, Fig. 1 illustrates diagrammatically the operation of the process of the present invention. In Fig. 1, 1 represents the fabric tubing coming from a suitable source such as a reel thereof. Fabric tubing 1 is positioned for upward movement through coating applicator 3 by means of pulley 2. Fabric tubing 1 passes vertically, in the direction noted by the arrow, through coating applicator 3. In coating applicator 3 is maintained a body of the plastisol 8, the plastisol being admitted to applicator 3 through conduit 4. In this particular instance, as shown in the drawing, the depth of plastisol in the vertical section of conduit 4 controls the static head pressure of plastisol in applicator 3. Coating applicator 3 is equipped at its bottom with an orifice 9 of the type described through which the fabric tubing 1 enters the body of plastisol. At the top of applicator 3 is an orifice 10, of the type described in vertical alignment with the bottom orifice and having a diameter somewhat larger than the outside diameter of the fabric tubing passing therethrough, as discussed above. Intermediate the entrance and exit orifices is a constricting die, or orifice, 11, axially aligned with the other two orifices. In passing through the body of plastisol, in applicator 3, fabric tubing 1 picks up a film of the plastisol, the final thickness of which film is determined by the width of the annular space between the outside of the fabric tubing and the inner periphery of the upper orifice. Fabric tubing 1, with the wet film of plastisol thereon, passes vertically upwardly from applicator 3 through heating zone 6. Upon the emergence of the coated fabric tubing from heating zone 6, the coating is permitted to cool to a point at which the coating loses its softness and becomes set. The length of time during which the coated tubing is in contact with air at room temperature between heating zone 6 and pulley 7 is sufficient to cool the coating to the desired degree, although auxiliary means such as a blower to force a current of air over the coated tubing may be used to hasten the operation, if desired. The coated tubing then passes over pulley 7 to a reel or other device for collecting the tubular product.

Fig. 2 illustrates the tubular product produced as the result of the process and in that figure, 1 represents the tubular fabric and 21 represents the continuous cylindrical coating thereon.

Figure 3 illustrates a portion of applicator 3 in section. In Figure 3, fabric tubing 1, is shown entering applicator 3 through orifice 9 where it contacts the body of plastisol 8. The fabric tubing then passes through die 11 where it is constricted by virtue of the diameter of orifice 11 being somewhat less than the normal outside diameter of the fabric tubing. Upon emerging from orifice 11, the fabric tubing is held tautly for passage through orifice 10. Between orifice 11 and orifice 10, the fabric tubing picks up a film of plastisol, the ultimate thickness of which is controlled by the annular space between the outside of the fabric tubing and the diameter of orifice 10. Orifice 11 may be provided by an element having a hole therein, held in the position shown as by suitable arms extending from the walls and/or ends (i. e. top or bottom) of the receptacle.

The process of the present invention may be more readily understood from a consideration of the following specific example which is given for the purposes of illustration only, and is not intended to limit the scope of the invention in any way.

*Example*

In this example, the fabric tubing to be coated was a tubular braided fabric made of glass yarns which has been heat treated in accordance with common practice, such as by the process described and claimed in U. S. Patent #2,393,530. The fabric tubing had an inside diameter of .124 inch and an outside diameter of .152 inch. The plastisol employed comprised, as the resinous component, a copolymer of vinyl chloride and vinyl acetate in an amount of 45% by weight of the plastisol. The plastisol contained 21% of dioctyl phthalate and 25% of glycol sebacate as the plasticizer component, and contained about 8% of lead silicate as the heat-stabilizing agent and 1% of pigment. The coating applicator was of the type described above in connection with said copending application Serial Number 165,232 in which the depth of the plastisol therein was about 3 inches. The depth of plastisol maintained in the vertical portion of the conduit feeding the plastisol to the applicator was such as to provide a pressure in the applicator equivalent to about 18 inches of plastisol. The bottom orifice through which the fabric tubing entered the applicator had a diameter of .152 inch, the second constricting orifice had a diameter of .149 inch, and the top orifice, through which the coated fabric tubing left the applicator, had a diameter of .166 inch.

In coating the fabric tubing, the tubing was introduced vertically into the body of plastisol going through the three stated orifices in a vertical direction. In passing through the applicator, the fabric tubing picked up a film of the plastisol, the thickness of which was controlled at about 8½ mils by the difference between the diameter of the exit orifice and the outside diameter of the fabric tubing passing therethrough. In this particular instance, since the intermediate orifice reduced the outside diameter of the fabric tubing to .149 inch, the difference between the diameter of the exit orifice and the outside diameter of the fabric tubing passing therethrough was about 17 mils, and thus the thickness of the coating was, as stated, about 8½ mils.

Upon emerging from the body of plastisol, the fabric tubing with the wet film of plastisol thereon was passed vertically upward through a heating zone where the coating was heated to a temperature of about 385° F. Since the speed of the fabric tubing throughout the procedure, through the body of plastisol and through the heating zone, was 180 feet per hour, the coated fabric tubing resided in the heating zone for about two minutes. In the heating zone, the vinyl resin particles fluxed and diffused throughout the plastisol forming a continuous resinous mass. Upon the emergence of the coated tubing from the heating zone, the coating gradually cooled in the air to ordinary temperatures, losing its thermal tackiness. The resulting coated fabric tubing was then wound on a reel.

Considerable modification is possible in the selection of fabric tubing, in the selection of the particular ingredients of the vinyl resin plastisol, and in the particular conditions and techniques followed, without departing from the scope of the present invention.

I claim:

1. The process for the manufacture of tubular electrical insulation which comprises continuously pulling a fabric tubing vertically into and through a body of vinyl resin plastisol; constricting said fabric tubing while passing through said body of plastisol by the application of uniform radial compression which reduces the diameter of the tubing and, through the drag occasioned thereby, imparts tension to the tubing; continuously withdrawing the fabric tubing having a coating of plastisol thereon from said body of plastisol in a vertical direction while constricting the coated tubing to a predetermined diameter slightly greater than the outside diameter of the fabric tubing to fix the thickness of said coating; subjecting the resulting coated fabric tubing to heat while moving in a vertical direction to flux the vinyl resin particles, and permitting the resulting coated product to cool while moving in a vertical direction.

2. The process of claim 1 wherein said body of plastisol is under a small positive pressure.

3. The process of claim 1 wherein said vinyl resin is a copolymer of vinyl chloride and vinyl acetate.

4. The process of claim 1 wherein said fabric tubing is a woven fabric comprising glass yarns.

5. The process of claim 1 wherein said vinyl resin is a copolymer of vinyl chloride and vinyl acetate, and wherein said fabric tubing is a woven fabric comprising glass yarns.

6. The process for the manufacture of tubular electrical insulation which comprises continuously pulling a fabric tubing vertically into and through a body of vinyl resin plastisol, said plastisol being under a pressure equivalent to between about 6 and about 48 inches thereof; constricting said tubing, while passing through said body of plastisol, by the application of uniform radial compression which reduces the diameter of the tubing and, through the drag occasioned thereby, imparts tension to the tubing; continuously withdrawing said fabric tubing with a coating of plastisol thereon vertically from said body of plastisol while constricting the coated tubing to a predetermined diameter slightly larger than the outside diameter of the fabric tubing to fix the thickness of said coating; subjecting the resulting coated fabric tubing to heat while moving in a vertical direction whereby said coating is heated to a temperature between about 250° and about 600° F. to flux the vinyl resin particles, and permitting the resulting coated product to cool while moving in a vertical direction.

7. The process of claim 6 wherein said vinyl resin is a copolymer of vinyl chloride and vinyl acetate.

8. The process of claim 6 wherein said fabric tubing is a woven fabric comprising glass yarns.

9. The process of claim 6 wherein said vinyl resin is a copolymer of vinyl chloride and vinyl acetate, and wherein said fabric tubing is a woven fabric comprising glass yarns.

HOWARD J. SHIVE.

References Cited in the file of this patent

UNITED STATES PATENTS

| Number | Name | Date |
| --- | --- | --- |
| 2,011,398 | Dimmick | Aug. 13, 1935 |
| 2,245,708 | Patton | June 17, 1941 |
| 2,478,940 | Pape | Aug. 16, 1949 |
| 2,497,045 | Killingsworth et al. | Feb. 7, 1950 |
| 2,542,064 | Tilden | Feb. 20, 1951 |
| 2,604,688 | Slayter | July 19, 1952 |

FOREIGN PATENTS

| Number | Country | Date |
| --- | --- | --- |
| 423,547 | Great Britain | Feb. 4, 1935 |
| 60,644 | Norway | Mar. 27, 1939 |

OTHER REFERENCES

Patnode et al.: Synthetic Materials as Wire-Insulation, presented before the Paint and Varnish Division of the American Chemical Society at Baltimore, Md., during the week of April 3–7, 1939.